3,261,830
6-KETO-Δ5(10)-19-NOR-DERIVATIVES
OF CORTICAL HORMONES
Albert Bowers and Otto Halpern, Mexico City, Mexico, assignors to Syntex Corporation, Panama, Panama, a corporation of Panama
No Drawing. Filed July 9, 1963, Ser. No. 293,834
Claims priority, application Mexico, Apr. 3, 1963, 71,544
12 Claims. (Cl. 260—239.55)

The present invention relates to certain novel cyclopentanoperhydrophenanthrene derivatives and to the method for the preparation thereof.

More particularly, the present invention relates to a method for making the novel 6-keto-Δ5(10)- 19-nor derivatives of cortical hormones, represented by the following formulas:

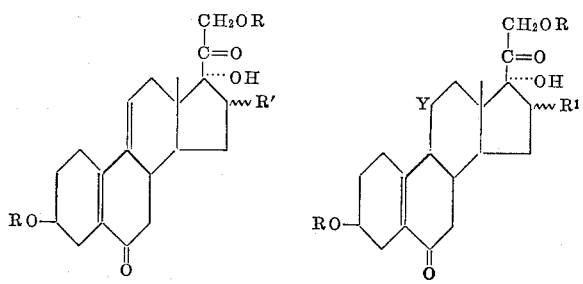

In the preceding formulas R represents hydrogen or an acyl radical of less than 12 carbon atoms; $R^1$ represents hydrogen, α-methyl, β-methyl, α-hydroxy, α-acyloxy; $R^1$ together with the hydroxy at C–17 may also represent the grouping

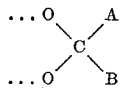

wherein A represents hydrogen or a lower alkyl radical and B represents a lower alkyl, aryl or aralkyl radical, containing up to 8 carbon atoms; Y represents hydrogen, β-hydroxy or keto. The acyl groups are derived from hydrocarbon carboxylic acids containing less than 12 carbon atoms, which may be saturated or unsaturated, of straight, branched, cyclic or cyclic-aliphatic chain, or aromatic, and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds obtained in accordance with the present invention are powerful anti-inflammatory agents, useful in the treatment of arthritis, rheumatism, inflammations of the skin, eyes, ears, etc., besides they present low catabolic, glycogenic and thymolytic activities.

The compounds object of our invention are obtained by the method illustrated by the following sequence of reactions:

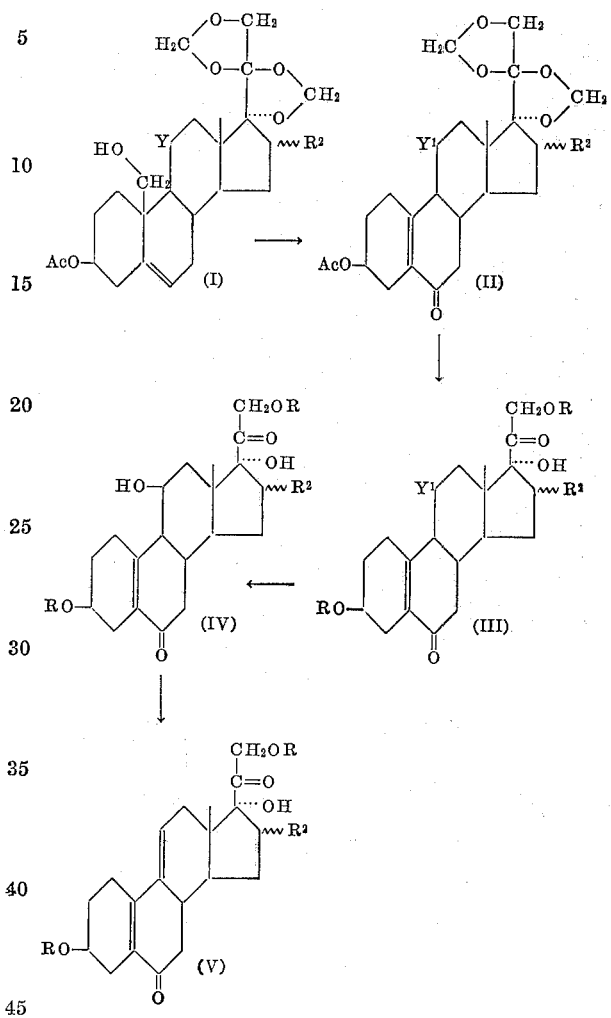

In the above formulas R and Y have the meaning heretofore indicated; $R^2$ represents hydrogen, α-methyl or β-methyl and $Y^1$ represents hydrogen or a keto group.

In practicing the process outlined above we start from the 3-acetate of 17,20;20,21-bismethylenedioxy-Δ5-pregnene-3β,19-diol, its 11-oxygenated and/or 16-methyl substituted derivatives (I), which upon treatment with the chromium trioxide-pyridine complex or with chromium trioxide in aqueous acetic acid solution, or in acetone in sulfuric acid medium, at room temperature and for a prolonged period of time, preferably between 24 hours and 7 days, give rise to the corresponding Δ5(10)-6-keto-19-nor-compounds (II). When the starting material possess also a hydroxyl group at C–11, this is also oxidized, producing the 11-ketones. Upon hydrolysis of the bismethylenedioxy group using conventional methods, preferably by heating with 60% formic acid, there are obtained the 3-acetate of Δ5(10)-19-nor-pregnene-3β,17α, 21-triol-6,20-dione, the 3-acetate of Δ5(10)-19-nor-pregnene-3β,17α,21-triol-6,11,20-trione as well as the corresponding 16-methyl derivatives (III; R=H).

Microbiological oxidation of the compounds not oxygenated at C-11 (III; R and $Y^1$=H), preferably using cultures of *Curvularia lunata, Cunninghamella bainieri, Cunninghamella blakeesleana*, etc., or by incubation with adrenal glands, previous saponification of the acyloxy group at C-3, there are obtained $\Delta^{5(10)}$-19-nor-pregnene-3β,11β,17α,21-tetrol-6,20-dione and its 16-methyl derivatives (IV).

Conventional esterification of these compounds (III and IV; R=H) with carboxylic acid anhydrides or acid chlorides of less than 12 carbon atoms in pyridine solution produced the corresponding 3,21-diesters (III and IV; R=acyl).

By reaction of the diesters of the 11β-hydroxylated compounds with mesyl chloride in dimethylformamide solution and in the presence of pyridine, at a temperature around 80° C. and for a period of time of between 30 minutes and 1 hour, there are obtained the corresponding 3,21 - diacyloxy - $\Delta^{5(10),9(11)}$ - 19 - nor - pregnadien - 17α-ol-6,20-diones (V; R=acyl), which upon saponification with a dilute solution of potassium hydroxide or potassium carbonate in methanol, at low temperature give rise to the corresponding free compounds (V; R=H).

In the case of compounds non-substituted at C-16 (III, IV and V; $R^2$=H), a hydroxyl group may be introduced in such position by incubation with *Streptomyces roseochromogenus* in a culture medium containing peptone and corn syrup. The 16α,17α-diols thus obtained are converted into the corresponding cyclic ketals or acetals by reaction with aldehydes or ketones containing up to 8 carbon atoms in the presence of an acid catalyst, such as for example perchloric or p-toluenesulfonic acids. Typical aldehydes and ketones are acetone, acetaldehyde, acetophenone, methyl ethyl ketone, cyclohexanone, diethyl ketone and the like.

Alternatively, the compounds object of our invention may be obtained by the process illustrated by the following equation:

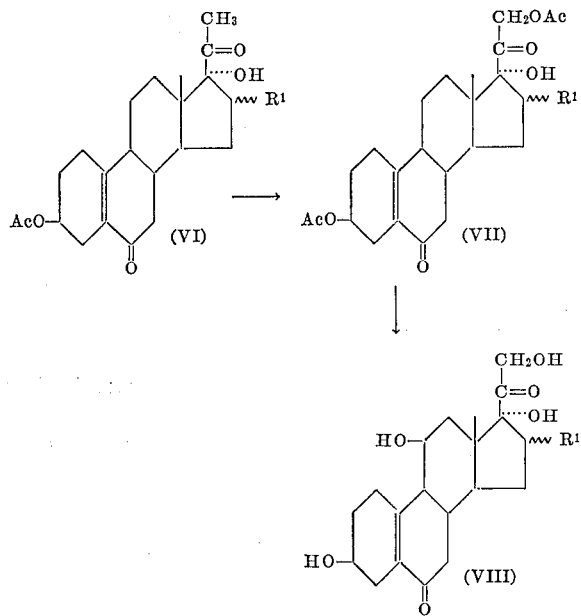

In the above formulas $R^1$ has the same meaning as heretofore indicated.

In practicing the process illustrated above, the 3-acetate of $\Delta^{5(10)}$-19-nor-pregnene-3β,17α-diol-6,20-dione or its 16-substituted derivatives (VI) was treated with iodine in the presence of calcium oxide and in mixture of tetrahydrofuran-methanol to produce the corresponding 21-iodo derivatives, which are in turn reacted with potassium acetate, preferably at reflux temperature, to afford the 3,21-diacetoxy compounds (VIII). Conventional saponification of these compounds produce the corresponding free compounds, which are then incubated with an oxygenating microorganism, as indicated hereinbefore, to produce the respective 11β-hydroxylated derivatives (VIII).

From these 11β-hydroxy compounds there may be obtained the corresponding 11-keto or $\Delta^{9(11)}$-dehydro derivatives, previous protection of the hydroxyl groups at C-3 and C-21, by the methods previously described.

The following specific examples serve to illustrate but are not intended to limit the scope of the present invention:

PREPARATION 1

A mixture of 6.6 g. of 16β-methyl-pregnenolone, 2.7 g. of p-toluenesulfonic acid and 300 cc. of acetic anhydride was submitted to a slow distillation, during 5 hours. The residue was cooled and poured into iced water. The product was then extracted with ether, the extract washed successively with an aqueous solution of sodium carbonate and water to neutral, dried and evaporated to dryness. The residue consisted of 3β,20-diacetoxy-16β-methyl-$\Delta^{5,17(20)}$-pregnadiene, which was utilized in the following step without purification.

6 g. of this crude 3β,20-diacetoxy compound were treated with 480 cc. of a 1.2 molar solution of perbenzoic acid in benzene (2.2 molar equivalents), at room temperature and in the dark, for 20 hours. Water was then added, the organic layer separated, washed with an aqueous solution of sodium bicarbonate, then with water, dried with anhydrous sodium sulfate and evaporated to dryness. The residue consisted of the crude 3β,20β-diacetoxy-16β-methyl-5α,6α;17α,20α-bis-oxido-pregnane.

This crude oxido compound was treated with 500 cc. of a 1% methanolic solution of potassium hydroxide at room temperature for 1 hour, the mixture was neutralized by addition of acetic acid, concentrated to small volume under reduced pressure, the product was precipitated by addition of ice water, filtered off, washed with water, dried and recrystallized from acetone-methanol, thus yielding 16β-methyl-5α,6α-oxido-pregnane-3β,17α-diol-20-one 3-acetate.

To 5 g. of the latter compound in 80 cc. of glacial acetic acid, there was added a mixture of 5 g. of sodium acetate, 1.6 g. of sodium acetate, 320 mg. of zinc and 2 drops of water. While cooling in an ice bath and stirring, there were added to the resulting mixture, 800 mg. of zinc dust in small portions. The stirring was continued for 6 hours and the temperature allowed to attain 25° C.

The reaction mixture was filtered and the filtrate diluted with ice water, alkalized with sodium bicarbonate and extracted with ethyl acetate. The extract was washed to neutral, dried over anhydrous sodium sulfate and evaporated to dryness. Crystallization from acetone-hexane yielded 16β-methyl-$\Delta^5$-pregnene-3β,17α-diol-20-one 3-acetate.

To a solution of 4.5 g. of the latter steroid in 100 cc. of anhydrous benzene there were added 1 g. of p-toluenesulfonic acid and 10 cc. of acetic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying, evaporation and crystallization of the residue from ether-hexane produced 16β-methyl-$\Delta^5$-pregnene-3β,17α-diol-20-one diacetate.

A suspension of 2.5 g. of the foregoing diacetate in 50 cc. of dioxane was treated with 3 cc. of 1 N perchloric acid and then with 1 g. of N-bromacetamide. The N-bromoacetamide was added portionwise, with stirring, in the course of 1 hour, in the dark and maintaining the temperature around 15° C. The mixture was stirred for 1 hour further in the dark at room temperature and then decolorized by the addition of 10% aqueous sodium bisulfite solution, 1 l. of water was added and the product was extracted with methylene chloride. The extract was washed with water, dried over anhydrous sodium sulfate and the solvent was evaporated under reduced pressure and at room temperature. Recrystallization from methylenechloride-hexane furnished 5α-bromo-16β-methyl-pregnane-3β,6β,17α-triol-20-one 3,17-diacetate.

To a solution of 2 g. of the latter 5α-bromo-compound in 75 cc. of dry benzene were added 3 g. of lead tetraacetate and the mixture was refluxed for 18 hours. It was then cooled, filtered, diluted with water and the benzene layer was separated, washed with water and the benzene was evaporated under reduced pressure. By chromatography of the residue on neutral alumina there was obtained the 5α-bromo-16β-methyl-6β,19-oxido-pregnane-3β,17α-diol-20-one diacetate.

A mixture of 1 g. of the last named steroid, 5 g. of zinc dust and 50 cc. of ethanol was refluxed for 16 hours. It was then filtered through celite and the filtrate evaporated to dryness. Crystallization of the residue from acetone-hexane yielded 16β-methyl-Δ$^5$-pregnene-3β,17α,19-triol-20-one 3,17-diacetate.

Example I

A solution of 6 g. of the 3-monoacetate of 17,20;20,21-bismethylenedioxy-Δ$^5$-pregnene-3β,19-diol in 120 cc. of pyridine was added to a mixture of 6 g. of chromium trioxide in 120 cc. of pyridine. The reaction mixture was maintained at room temperature for 1 week; it was then diluted with ethyl acetate, filtered through celite and the filtrate was washed well with water, dried and evaporated to dryness. The residue was crystallized from acetone-hexane, to produce the acetate of 17,20;20,21-bismethylenedioxy-Δ$^{5(10)}$-19-nor-pregnen-3β-ol-6-one.

A mixture of 4 g. of the foregoing compound and 80 cc. of 60% formic acid was heated on the steam bath for 1 hour, cooled, diluted with water and the formed precipitate filtered off, washed with water, dried and recrystallized from acetone-hexane to produce the 3-acetate of Δ$^{5(10)}$-19-nor-pregnene-3β,17α,21-triol-6,20-dione.

A solution of 3 g. of the latter compound in 100 cc. of methanol was treated with 1 g. of potassium carbonate dissolved in 5 cc. of water, and the reaction mixture was kept at room temperature for 1 hour. It was then neutralized with acetic acid and concentrated to a small volume, diluted with water and the formed precipitate collected by filtration, to give Δ$^{5(10)}$-19-nor-pregnene-3β,17α,21-triol-6,20-dione.

In the same manner, starting from the 3-monoacetate of 17,20;20,21-bismethylenedioxy-Δ$^5$-pregnene-3β,19-diol-11-one there were obtained successively; the acetate of 17,20;20,21-bismethylenedioxy-Δ$^{5(10)}$-19-nor-pregnen-3β-ol-6,11-dione, the 3-acetate of Δ$^{5(10)}$-19-nor-pregnene-3β,17α,21-triol-6,11,20-trione and Δ$^{5(10)}$-19-nor-pregnene-3β,17α,21-triol-6,11,20-trione.

Example II

A solution of 1.1 equivalents of chromic acid in 5 cc. of 80% acetic acid was added dropwise to a stirred solution of 1 g. of the 3-monoacetate of 17,20;20,21-bismethylenedioxy Δ$^5$-pregnene-3β,19-diol in 20 cc. of glacial acetic acid, maintaining the temperature around 20° C.

The mixture was allowed to stand for 12 hours at room temperature, poured into ice water and the formed precipitate collected by filtration, washed with water and recrystallized from methanol to produce the acetate of 17,20;20,21-bismethylenedioxy-Δ$^{5(10)}$-19-nor-pregnen-3β-ol-6-one, identical to that obtained by the method of the preceding example.

Example III

A strain of *Curvularia lunata* ATCC 13935 was grown in a Sabourini-glucose-agar medium (Difco). The growth obtained after incubating for a week at 25° C. was suspended in 5 cc. of sterile water. This suspension was divided in 5 portions of 1 cc. each which were employed for inoculating 5 Erlenmeyer flasks of 250 cc. capacity containing each 50 cc. of a culture medium of the following composition:

| | G. |
|---|---|
| Glucose | 20 |
| $(NH_4)_2HPO_4$ | 5 | or

| | |
|---|---|
| $NaNO_3$ | 3 |
| $K_2HPO_4$ | 1 |
| $MgSO_4.7H_2O$ | 0.2 |
| KCl | 0.5 |
| $ZnSO_4$ | Traces |
| $FeSO_4.7H_2O$ | Traces |

Distilled water to complete 1 l.

The cultures were incubated under rotatory stirring for 72 hours at 25° C. The growth was homogenized for 1 minute in a Waring Blendor; 2 cc. portions of the suspension thus obtained were employed for inoculating approximately 100 Erlenmeyer flasks containing the same medium described above. The mixtures were incubated for 24 hours under rotatory stirring at 25° C. and 280 r.p.m.; to each flask there was added 0.5 cc. of a solution of 0.5 g. of Δ$^{5(10)}$-19-nor-pregnene-3β,17α,21-triol-6,20-dione in 50 cc. of 95% ethanol and the incubation was continued under the same conditions for 48 hours. The contents of the flasks were combined and extracted with four portions of methylene chloride. The combined extract was dried over anhydrous sodium sulfate and concentrated at low temperature to a volume of 25 cc. This solution was adsorbed on 4 g. of silica gel and eluted with methylene chloride-ether (9:1) to produce Δ$^{5(10)}$-19-nor-pregnene-3β,11β,17α,21-tetrol-6,20-dione.

A mixture of 1 g. of the preceding compound, 4 cc. of pyridine and 4 cc. of acetic anhydride was kept at room temperature for 4 hours, poured into ice water and the formed precipitate was collected by filtration, washed with water and dried. Crystallization from acetone-hexane gave the 3,21-diacetate of Δ$^{5(10)}$-19-nor-pregnene-3β,11β,17α,21-tetrol-6,20-dione.

Example IV

A solution of 1 g. of the 3,21-diacetate of Δ$^{5(10)}$-19-nor-pregnene-3β,11β,17α,21-tetrol-6,20-dione in 15 cc. of acetone was cooled to 0° C. and treated under nitrogen atmosphere and stirring with an 8 N chromic acid solution (prepared by mixing 26 g. of chromium trioxide with 23 cc. of concentrated sulfuric acid and dilution with water to 100 cc.), until the color of the reagent persisted in the mixture. It was stirred for 5 minutes further at 0–5° C. and diluted with water. The precipitate was filtered off, washed with water and dried under vacuum thus producing the 3,21-diacetate of Δ$^{5(10)}$-19-nor-pregnene-3β,17α,21-triol-6,11,20-trione.

Example V

To a cold solution of 1 g. of the 3,21-diacetate of Δ$^{5(10)}$-19-nor-pregnene-3β,11β,17α,21-tetrol-6,20-dione in 12.5 cc. of dimethylformamide there were added 0.42 g. of mesyl chloride and 0.5 cc. of pyridine and the resulting solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished the 3,21-diacetate of Δ$^{5(10),9(11)}$-19-nor-pregnadiene-3β,17α,21-triol-6,20-dione. The preceding compound was saponified in accordance with the method described in Example I, to produce Δ$^{5(10),9(11)}$-19-nor-pregnadiene-3β,17α-21-triol-6,20-dione.

Example VI

By following the method described in Example I, 7.5 g. of the 3,17-diacetate of 16α-methyl-Δ⁵-pregnene-3β,17α,19-triol-20-one were converted into the diacetate of 16α-methyl-$\Delta^{5(10)}$-19-nor-pregnene-3β,17α-diol-6,20-dione.

A solution of 5 g. of the foregoing compound in 250 cc. of methanol was heated at reflux temperature for 3 hours with 1 g. of potassium hydroxide dissolved in 2 cc. of water; it was then poured into ice water, the formed precipitate collected by filtration, washed to neutral and dried, thus affording 16α-methyl-$\Delta^{5(10)}$-19-nor-pregnene-3β,17α-diol-6,20-dione, which was esterfied with acetic anhydride in pyridine, in accordance with the method described in Example III, to produce the 3-monoacetate of 16α-methyl-$\Delta^{5(10)}$-19-nor-pregnene-3β,17α-diol-6,20-dione.

A cold solution of 4 g. of the foregoing compound in 30 cc. of tetrahydrofuran and 18 cc. of methanol was treated under continuous stirring with 6 g. of pure calcium oxide, in small portions, and then with 6 g. of iodine. The stirring was continued at room temperature until the solution turned pale yellow. The mixture was poured into ice water containing 18 cc. of acetic acid and 2 g. of sodium thiosulfate. After stirring for 15 minutes the solution was decanted and the precipitate was collected by filtration, thus giving the 3-monoacetate of 21-iodo-16α-methyl-$\Delta^{5(10)}$-19-nor-pregnene-3β,17α-diol-6,20-dione. This compound was mixed with 80 cc. of acetone and 12 g. of recently fused potassium acetate and the mixture was refluxed for 8 hours, concentrated to a small volume, diluted with water and extracted with ethyl acetate; the extract was washed with water, dried over anhydrous sodium sulfate and concentrated until crystallization started. The precipitate was collected and crystallized from methanol water, thus yielding the 3,21-diacetate of 16α-methyl-$\Delta^{5(10)}$-19-nor-pregnene-3β,17α,21-triol-6,20-dione.

Example VII

A cold solution of 2 g. of the 3,21-diacetate of 16α-methyl-$\Delta^{5(10)}$-19-nor-pregnene-3β,17α,21-triol-6,20-dion in 50 cc. of methanol was treated with 5 cc. of a 4% aqueous solution of potassium hydroxide. The reaction mixture was kept at 0° C. for 1 hour under nitrogen atmosphere, neutralized with acetic acid and the methanol distilled under reduced pressure.

The residue was triturated with water, the solid was filtered off, washed with water and dried under vacuum. Crystallization from ethyl-acetate-methanol gave 16α-methyl-$\Delta^{5(10)}$-19-nor-pregnene-3β,17α,21-triol-6,20-dione.

The preceding compound was incubated with a culture of *Curvularia lunata* ATCC 13935, by following the method described in Example III, to produce 16α-methyl-$\Delta^{5(10)}$-19-nor-pregnene,3β,11β,17a,21-tetrol-6,20-dione, which upon esterification with acetic anhydride in pyridine was converted into its 3,21-diacetate.

Example VIII

By following the method described in Example II, 1 g. of the 3,17-diacetate of 16β-methyl-Δ⁵-pregnene-3β,17α,19-triol-20-one was treated with chromium trioxide in acetic acid to afford the diacetate of 16β-methyl-$\Delta^{5(10)}$-19-nor-pregnene-3β,17α-diol-6,20-dione.

The foregoing compound was then submitted to the reactions described in Example VI, to produce as final product the 3,21-diacetate of 16β-methyl-$\Delta^{5(10)}$-19-nor pregnene-3β,17α,21-triol-6,20-dione, which was saponified with a dilute solution of potassium hydroxide in methanol, in accordance with the method described in the preceding example, to give 16β-methyl-$\Delta^{5(10)}$-19-nor-pregnene-3β,17α,21-triol-6,20-dione.

Upon incubation of the foregoing compound with a culture of *Curvularia lunata* by following the method of Example III, there was obtained 16β-methyl-$\Delta^{5(10)}$-19-nor-pregnene-3β,11β,17α,21-tetrol-6,20-dione.

Example IX

By following the esterification method described in Example III, but using propionic, caproic, and cyclopentylpropionic anhydrides as esterifying agents, there were obtained the 3,21-dipropionates, dicaproates and dicyclopentylpropionates of $\Delta^{5(10)}$-19-nor-pregnene-3β,11β,17α,21-tetrol-6,20-dione, 16α-methyl-$\Delta^{5(10)}$-19-nor-pregnene-3β,11β,17α,21-tetrol-6,20-dione and 16β-methyl-$\Delta^{5(10)}$-19-nor-pregnene-3β,11β,17α,21-tetrol-6,20-dione.

Example X

Example IV was repeated but using as starting materials the 3,21-diacetate of 16α-methyl-$\Delta^{5(10)}$-19-nor-pregnene-3β,11β,17α,21-tetrol-6,20-dione and the 3,21-dipropionate of 16β-methyl-$\Delta^{5(10)}$-19-nor-pregnene-3β,11β,17α,21-tetrol-6,20-dione, to produce respectively; the 3,21-diacetate of 16α-methyl-$\Delta^{5(10)}$-19-nor-pregnene-3β,17α,21-triol-6,11,20-trione and the 3,21-dipropionate of 16β-methyl-$\Delta^{5(10)}$-19-nor-pregnene-3β,17α,21-triol-6,11,20-trione.

Example XI

A culture of *Streptomyces roseochromogenus* ATTC 3347 was prepared in an inclined agar medium containing 1% of glucose and 1% of yeast extract. 1 cc. of a suspension of this culture was then used to inoculate each one of a series of 250 cc. flasks containing 50 cc. of a sterilized aqueous medium of 2% peptone and 5% corn syrup, the mixtures were then incubated in a shaking machine at 28° C. under aeration for a period of 24–48 hours. There was thus obtained a vegetating growing culture of *Streptomyces roseochromogenus* which was used for the subsequent incubation of the steroid.

10 mg. of $\Delta^{5(10)}$-19-nor-pregnene-3β,11β,17α,21-tetrol-6,20-dione were added to each 50 cc. of the vegetating culture of *Streptomyces resochromogenus*, obtained as described above. The mixture was stirred for 48–72 hours with aeration and then extracted several times with methylene dichloride. The extract was washed with water, dried over anhydrous sodium sulfate, filtered and evaporated under reduced pressure.

The residue was purified by chromatography on silica gel thus giving $\Delta^{5(10)}$-19-nor-pregnene-3β,11β,16α,17α,21-pentol-6,20-dione.

Example XII

To a solution of 1 g. of the foregoing pentol in 50 cc. of acetone there were added 20 drops of 70% perchloric acid. After 1 hour at room temperature 20 drops of pyridine were added and the resulting solution was evaporated to dryness under reduced pressure. 30 cc. of water were added to the residue and it was then extracted several times with 80 cc. of ethyl acetate. The combined extracts were washed to neutrality with water, dried over sodium sulfate and evaporated to dryness. The residue was triturated with methanol, to produce 16α,17α-isopropylidenedioxy-$\Delta^{5(10)}$-19-nor-pregnene-3β,11β,21-triol-6,20-dione. Upon esterification of the preceding compound with acetic, propionic and undecenoic anhydrides, in accordance with the method of Example III, there were obtained the respective 3,21-diesters.

Example XIII

By following the method described in Example IV, 1 g. of the 3,21-dipropionate of 16α,17α-isopropylidenedioxy-$\Delta^{5(10)}$-19-nor-pregnene-3β,11β,21-triol-6,20-dione was oxidized with 8 N chromic acid in acetone solution to give the dipropionate of 16α,17α-isopropylidenedioxy-$\Delta^{5(10)}$-19-nor-pregnene-3β,21-diol-6,11,20-trione.

Example XIV

Example V was repeated but using as starting material the 3,21-diacetate of 16α-methyl-$\Delta^{5(10)}$-19-nor-pregnene-3β,11β,17α,21-tetrol-6,20-dione, thus producing the 3,21- diacetate of 16α-methyl-Δ^5(10),9(11) - 19 - nor-pregnadiene-3β,17α,21-triol-6,20-dione.

The foregoing compound was saponified with dilute solution of potassium hydroxide in methanol, in accordance with the method described in Example VII, to give 16α-methyl-Δ^5(10),9(11) - 19 - nor-pregnadine-3β,17α,21-triol-6,20-dione.

In a similar manner, starting from the 3,21-diacetate of 16α,17α-isopropylidenedioxy-Δ^5(10) - 19 - nor-pregnene-3β,11β,21-triol-6,20-dione there were obtained successively the diacetate of 16α,17α-isopropylidenedioxy-Δ^5(10),9(11) - 19-nor-pregnadiene-3β,21-diol-6,20-dione and 16α,17α-isopropylidenedioxy-Δ^5(10),9(11) - 19 - nor-pregnadiene-3β,21-diol-6,20-dione.

Example XV

In accordance with the method described in Example XI, 1 g. of Δ^5(10)-19-nor-pregnene-3β,17α,21-triol-6,20-dione was incubated with a culture of *Streptomyces roseochromogenus* to produce-Δ^5(10) - 19 - nor-pregnene-3β,16α,17α,21-tetrol-6,20-dione.

Upon treatment of the foregoing compound with acetic, propionic and cyclopentylpropionic anhydrides in pyridine solution, there were obtained the 3,16,21-triesters i.e., 3β,16α,21-triacetoxy-Δ^5(10) - 19 - nor-pregnen-17α-ol-6,20-dione, 3β,16α,21-tripropionoxy-Δ^5(10) - 19 - nor-pregnen-17α-ol-6,20-dione and 3β,16α,21-tricyclopentylpropionoxy-Δ^5(10)-19-nor-pregnen-17α-ol-6,20-dione.

Example XVI

A solution of 500 mg. of Δ^5(10)-19-nor-pregnene-3β,16α,17α,21-tetrol-6,20-dione in 20 cc. of chloroform was treated with 1 g. of acetaldehyde and 5 drops of 3 N perchloric acid and the mixture was stirred at room temperature for 2 hours. After diluting with water the chloroform layer was separated, washed with aqueous saturated sodium bicarbonate solution and then with water, the choloroform was distilled and the residue was crystallized from acetone-ether, to afford the 16α,17α-acetaldehyde acetal of Δ^5(10)-19-nor-pregnene-3β,16α,17α,21-tetrol-6,20-dione.

Example XVII

By following the method described in Example I, 5 g. of the 3-monoacetate of 16α,17α-isopropylidenedioxy-Δ^5-pregnene-3β,19-diol-20-one were oxidized with chromium trioxide in pyridine, to produce the acetate of 16α,17α-isopropylidenedioxy-Δ^5(10) - 19 - nor-pregnen-3β-ol-6,20-dione.

The foregoing compound was treated with iodine in the presence of calcium oxide and in mixture of tetrahydrofurane-methanol, and the 21-iodo derivative thus obtained was reacted with potassium acetate in acetone solution, to produce the diacetate of 16α,17α-isopropylidenedioxy-Δ^5(10)-19-nor-pregnene-3β,21-diol-6,20-dione.

Example XVIII

A mixture of 1 g. of Δ^5(10)-19-nor-pregnene-3β,11β,16α,17α,21-pentol-6,20-dione, 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from acetone-hexane yielded the 16α,17α-acetophenonide of Δ^5(10) - 19 - nor-pregene-3β,11β,16α,17α,21-pentol-6,20-dione. The foregoing compound was converted into its 3,21-diacetate by reaction with acetic anhydride in pyridine.

Example XIX

In accordance with the saponification method described in Example VII, the 3,21-diacetate of Δ^5(10)-19-nor-pregnene-3β,17α,21-triol-6,11,20-trione and the 3,21-dipropionate of 16α,17α-isopropylidenedioxy-Δ^5(10) - 19 - nor-pregnene-3β,21-diol-6,11,20-trione were converted into the respective free compounds, i.e., Δ^5(10)-19-nor-pregnene-3β,17α,21-triol-6,11,20-trione and 16α,17α-isopropylidenedioxy-Δ^5(10)-19-nor-pregnene-3β,21-diol-6,11,20-trione.

We claim:
1. A compound of the following formula:

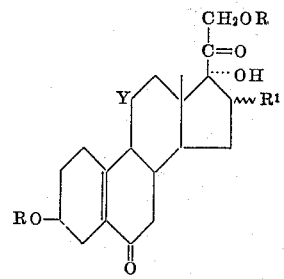

wherein R is selected from the group consisting of hydrogen and an acyl radical of less than 12 carbon atoms; R¹ is selected from the group consisting of hydrogen, α-methyl, β-methyl, α-hydroxy, α-acyloxy; R¹ together with the hydroxyl group at C–17 represents also the grouping

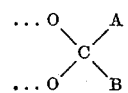

wherein A is selected from the group consisting of hydrogen and a lower alkyl radical and B is selected from the group consisting of lower alkyl, aryl and aralkyl radicals containing up to eight carbon atoms; Y is selected from the group consisting of hydrogen, β-hydroxy and keto.

2. Δ^5(10) - 19 - nor-pregnene-3β,17α,21-triol-6,20-dione.
3. Δ^5(10) - 19 - nor-pregnene-3β,11β,17α,21-tetrol-6,20-dione.
4. 16α - methyl - Δ^5(10)-19-nor-pregnene-3β,11β,17α,21-tetrol-6,20-dione.
5. Δ^5(10) - 19 - nor-pregnene-3β,11β,16α,17α,21-pentol-6,20-dione.
6. 16α,17α - isopropylidenedioxy - Δ^5(10)-19-nor-pregnene-3β,11β,21-triol-6,20-dione.
7. Δ^5(10) - 19 - nor - pregnene-3β,17α,21-triol-6,11,20-trione.
8. 16α,17α - isopropylidenedioxy - Δ^5(10)-19-nor-pregnene-3β,21-diol-6,11,20-trione.
9. A compound of the following formula:

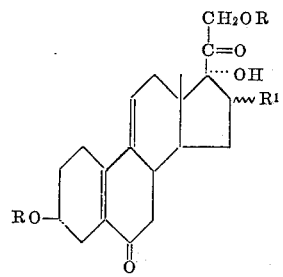

wherein R is selected from the group consisting of hydrogen and an acyl radical of less than 12 carbon atoms; R¹ is selected from the group consisting of hydrogen, α-methyl, β-methyl, α-hydroxy, α-acyloxy; and R¹ together with the hydroxyl group at C–17 represents also the grouping

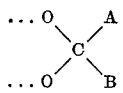

wherein A is selected from the group consisting of hydrogen and a lower alkyl radical and B is selected from the group consisting of lower alkyl, aryl and aralkyl radicals containing up to eight carbon atoms.

10. $\Delta^{5(10),9(11)}$ - 19 - nor-pregnadiene-3β,17α,21-triol-6,20-dione.

11. 16α - methyl - $\Delta^{5(10),9(11)}$-19-nor-pregnadiene-3β,17α,21-triol-6,20-dione.

12. 16α,17α - isopropylidenedioxy - $\Delta^{5(10),9(11)}$-19-nor-pregnadien-3β,21-diol-6,20-dione.

References Cited by the Examiner
UNITED STATES PATENTS

| | | | |
|---|---|---|---|
| 3,178,419 | 4/1965 | Jeger et al. | 260—239.55 |
| 3,206,460 | 9/1965 | Bowers | 260—239.55 |

LEWIS GOTTS, *Primary Examiner.*

T. MESHBESHER, *Assistant Examiner.*